US008517806B2

(12) United States Patent
Fillenworth et al.

(10) Patent No.: US 8,517,806 B2
(45) Date of Patent: Aug. 27, 2013

(54) APPARATUS AND METHOD FOR PROCESSING OF PORK BELLIES

(75) Inventors: Trent Allen Fillenworth, Hutchinson, KS (US); Gregory Allen Roepka, Hutchinson, KS (US)

(73) Assignee: Stainless Systems, Inc., Hutchinson, KS (US)

( * ) Notice: Subject to any disclaimer, the term of this patent is extended or adjusted under 35 U.S.C. 154(b) by 430 days.

(21) Appl. No.: 12/942,825

(22) Filed: Nov. 9, 2010

(65) Prior Publication Data

US 2012/0115406 A1 May 10, 2012

(51) Int. Cl.
A22C 25/12 (2006.01)
(52) U.S. Cl.
USPC .......................................................... 452/179
(58) Field of Classification Search
USPC ................. 452/149, 150, 151, 154, 155, 156, 452/157
See application file for complete search history.

(56) References Cited

U.S. PATENT DOCUMENTS

| 4,561,150 | A | | 12/1985 | Townsend | |
|---|---|---|---|---|---|
| 5,156,566 | A | * | 10/1992 | Righele | 452/46 |
| 5,338,250 | A | * | 8/1994 | Swilley et al. | 452/136 |
| 5,947,810 | A | * | 9/1999 | Magnasco et al. | 452/138 |
| 7,044,847 | B2 | * | 5/2006 | Ketels | 452/162 |
| 7,056,202 | B2 | * | 6/2006 | Pein | 452/161 |
| 7,506,748 | B2 | * | 3/2009 | Pugh et al. | 198/529 |
| 7,524,241 | B2 | * | 4/2009 | Markert | 452/149 |
| 2008/0261504 | A1 | | 10/2008 | Busch | |

FOREIGN PATENT DOCUMENTS

| JP | 04-116017 | 4/1992 |
|---|---|---|
| JP | 2008-228734 | 10/2008 |
| KR | 1010080101057 A | 11/2008 |

OTHER PUBLICATIONS

International Search Report and Written Opinionl; PCT/US2011/059988, International Filing Date: Nov. 9, 2011.

* cited by examiner

Primary Examiner — Richard Price, Jr.
(74) Attorney, Agent, or Firm — Hovey Williams LLP

(57) ABSTRACT

A device (30) is provided for the inversion of bodies of meat (e.g., pork bellies 162, 164) during processing thereof in order to eliminate the manual labor involved in conventional packing house operations. The device (30) includes a rotatable inversion drum (32) made up of inner and outer drum subassemblies (42, 44), which are selectively interconnected by means of lock pin cylinders (86). An entry conveyor (34) serves to direct incoming meat bodies to the drum (32) and an exit conveyor (36) is provided to convey inverted meat bodies away from the drum (32). In preferred forms, the drum (32) has a pair of circumferentially spaced apart, elongated, transversely extending clamping rods (90), which are selectively shiftable towards and away from the drum (32) in order to sequentially clamp an incoming meat body to the drum (32) during rotation thereof, and to release the meat body after inversion thereof onto exit conveyor (36). The operation of device (30) is controlled by appropriate sensors (118, 158, 160) operably coupled with a digital controller.

22 Claims, 16 Drawing Sheets

APPARATUS AND METHOD FOR PROCESSING OF PORK BELLIES

BACKGROUND OF THE INVENTION

1. Field of the Invention

The present invention is broadly concerned with apparatus and methods for inversion of bodies, and particularly pork bellies during processing thereof. More particularly, the invention is concerned with such apparatus and methods wherein a body to be inverted is directed towards a rotatable drum, the body is clamped to the drum, and through further rotation of the drum the body is inverted and deposited onto exit structure permitting downstream processing of the body.

2. Description of the Prior Art

In conventional processing of pork bellies, the skinned bellies are placed on a first moving belt. Trimmers working astride the belt trim and detail the moving bellies. Next, the bellies are manually inverted and placed on a second belt so as to expose the undersides of the bellies on the second belt. The second belt runs slower than the first belt, creating an inversion/transfer point which is dangerous and can lead to hand injuries. Additional workers downstream of the inversion/transfer point can then trim the now-exposed undersides of the bellies. After this trimming operation, the bellies are commonly brined for production of bacon. The manual inversion process is highly labor-intensive, owing to the fact that the bellies typically weigh 16-24 lbs. Hence, the personnel inverting the bellies are prone to over-exertion and repetitive motion injuries.

There is accordingly a real and unsatisfied need for apparatus to carry out pork belly inversions without the need for significant manual labor. However, providing such equipment is not a straightforward matter. This stems from the fact that the bellies are of varying weights and dimensions, and moreover may be in different conditions, e.g., partially frozen or completely fresh.

SUMMARY OF THE INVENTION

The present invention overcomes the problems outlined above and provides apparatus for inverting bodies of meat, such as pork bellies, without the need for manual lifting and turning thereof. The apparatus of the invention broadly comprises a rotatable drum including a clamping assembly operable to clamp the body of meat to the drum, and to release the body of meat after inversion thereof. Entry structure, such as a conveyor, is used to deliver incoming bodies of meat to the inversion drum; similarly, exit structure is provided to convey the released body of meat away from the drum.

In preferred forms, the drum is made up of an inner drum subassembly and an outer drum subassembly. Coupling mechanism is provided to selectively interconnect the outer drum subassembly to the inner drum subassembly during rotation of the latter. Such coupling structure may be in the form of one or more lock pin cylinders operably attached to one of the drum subassemblies and including a shiftable rod, with a series of apertures provided on the other of the drum subassemblies. The lock pin cylinder is operable to extend the rod into one of the apertures in order to interconnect the drum subassemblies.

The drum clamping assembly preferably comprises an elongated, transversely extending clamping rod and structure supporting the clamping rod for selective movement thereof toward and away from the drum. The support structure may comprise a pair of shiftable mounting struts secured to the opposed ends of the clamping rod, with a piston and cylinder assembly operably coupled with at least one of the mounting struts and operable to selectively move the clamping rod toward and away from the drum.

In the method of the invention, a body of meat is directed towards a rotatable drum and is clamped to the drum. The drum is caused to rotate in order to invert the body of meat, whereupon it is released from the drum and conveyed in an inverted position away from the drum.

DETAILED DESCRIPTION OF THE PREFERRED EMBODIMENT

Figure 1:
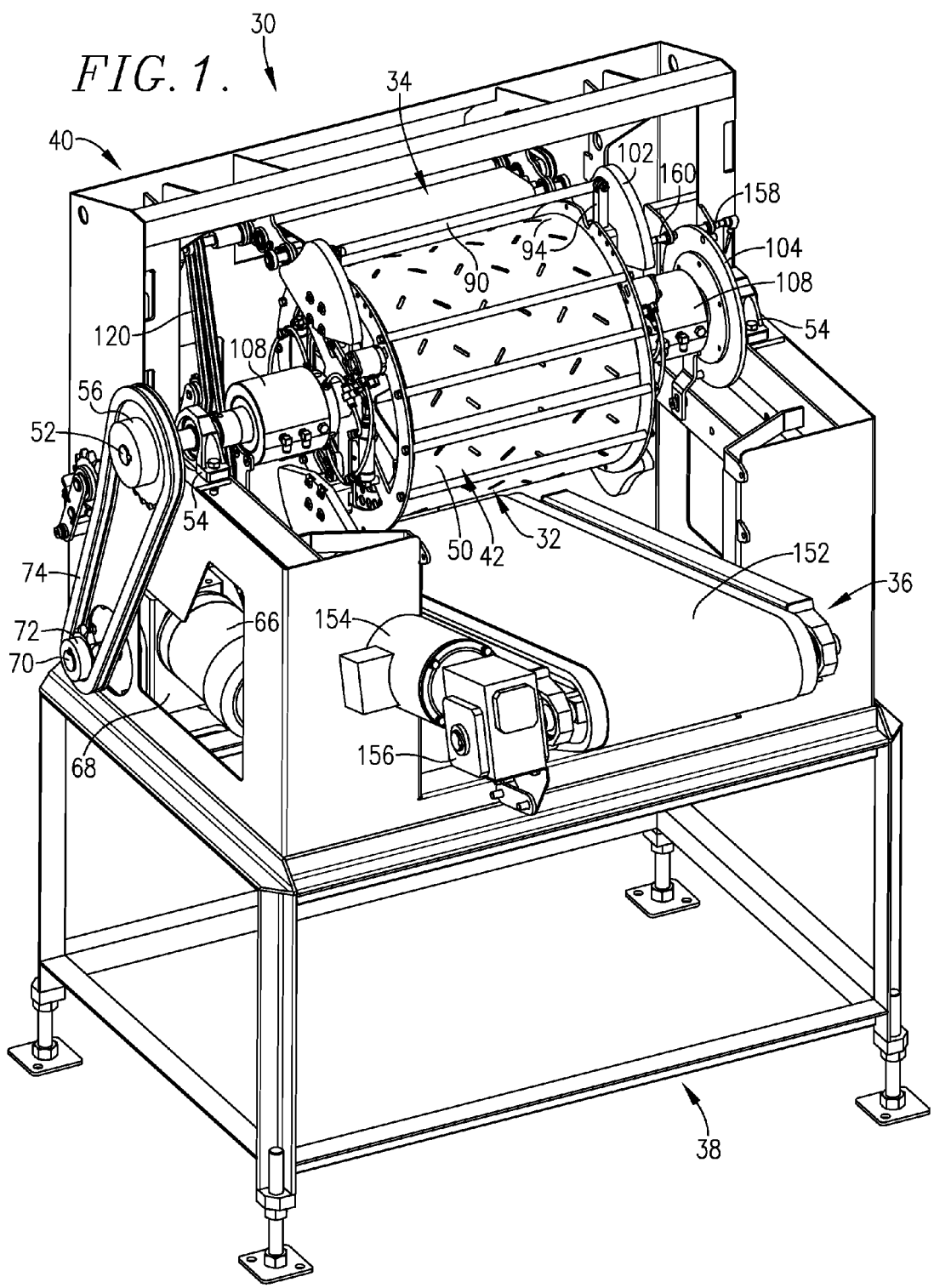
FIG. 1 is a perspective view of an inversion device in accordance with the invention, depicting the exit end thereof and illustrating the main drive assembly.

Turning now to the drawings, an inversion device 30 is illustrated in FIGS. 1-4 and broadly includes an inversion drum 32, an entry conveyor 34, and exit conveyor 36. These components are supported by a floor-mounted frame assembly 38 and are situated within a housing 40. Although not shown, it will be appreciated that the operating components of device 30 are covered by appropriate guards and the like.

Figure 9:
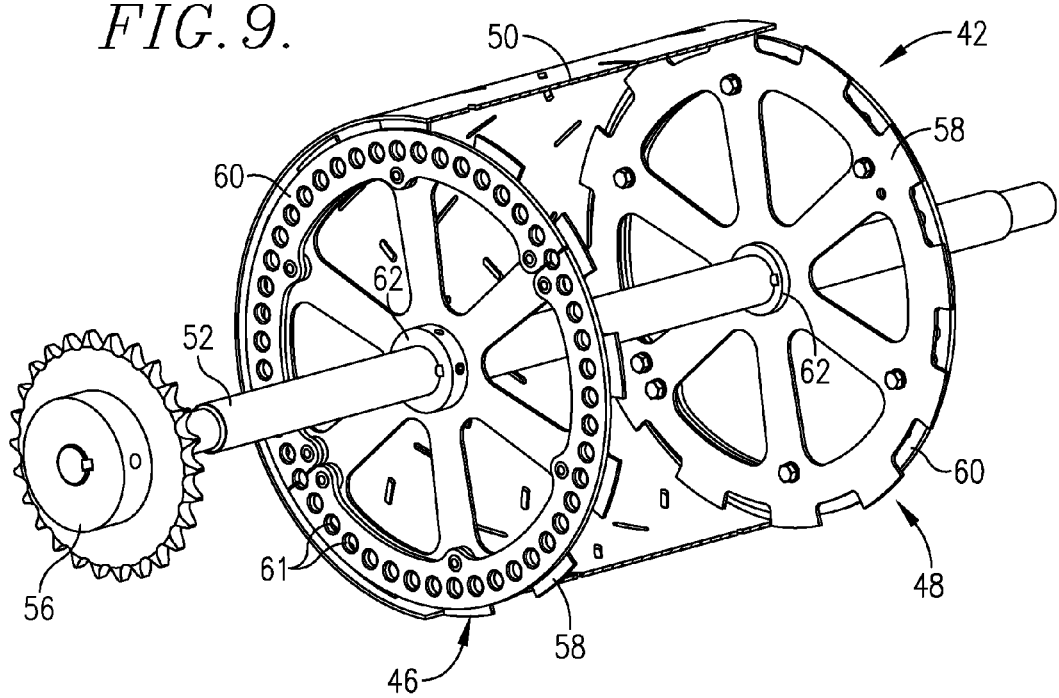
FIG. 9 is a perspective view of the inner drum subassembly.
Figure 10:
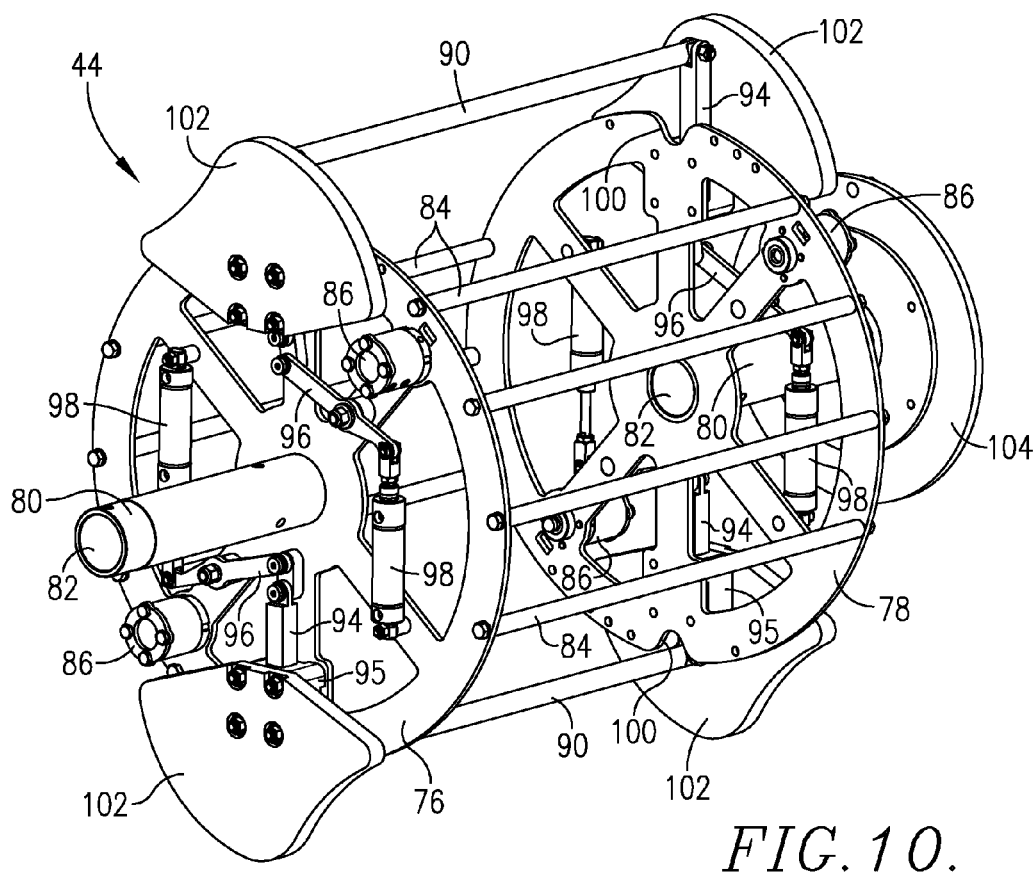
FIG. 10 is a perspective view of the outer drum subassembly.

The inversion drum 32 comprises an inner subassembly 42 (FIG. 9) and a surrounding outer subassembly 44 (FIG. 10). The inner subassembly 42 includes a pair of circular end plate assemblies 46 and 48 as well as a surrounding cylindrical slotted wall 50. As illustrated in FIGS. 1-4, the entire subassembly 42 is supported on a central, transversely extending shaft 52. The outer ends of shaft 52 are supported on bearings 54 secured to housing 40, as shown. Each end plate assembly 46, 48 includes a circular, spoked member 58 and an outer annular plate 60 having a plurality of apertures 61 therethrough. A drive sprocket 56 is secured to the extreme left-hand end of shaft 52, as viewed in FIG. 9. The end plate assemblies 46 and 48 are keyed to shaft 52 by means of couplers 62 so that the end plates and wall 50 rotate with the shaft 52.

A primary drive motor 66 is located within housing 40 and has a variable frequency drive within the motor control cabinet thereof. The motor is coupled with a gear reducer assembly 68 having an output shaft 70, and a sprocket 72 keyed to the latter. A drive chain 74 is trained around the sprockets 72 and 56 for powered rotation of the inner subassembly 42.

Figure 8:
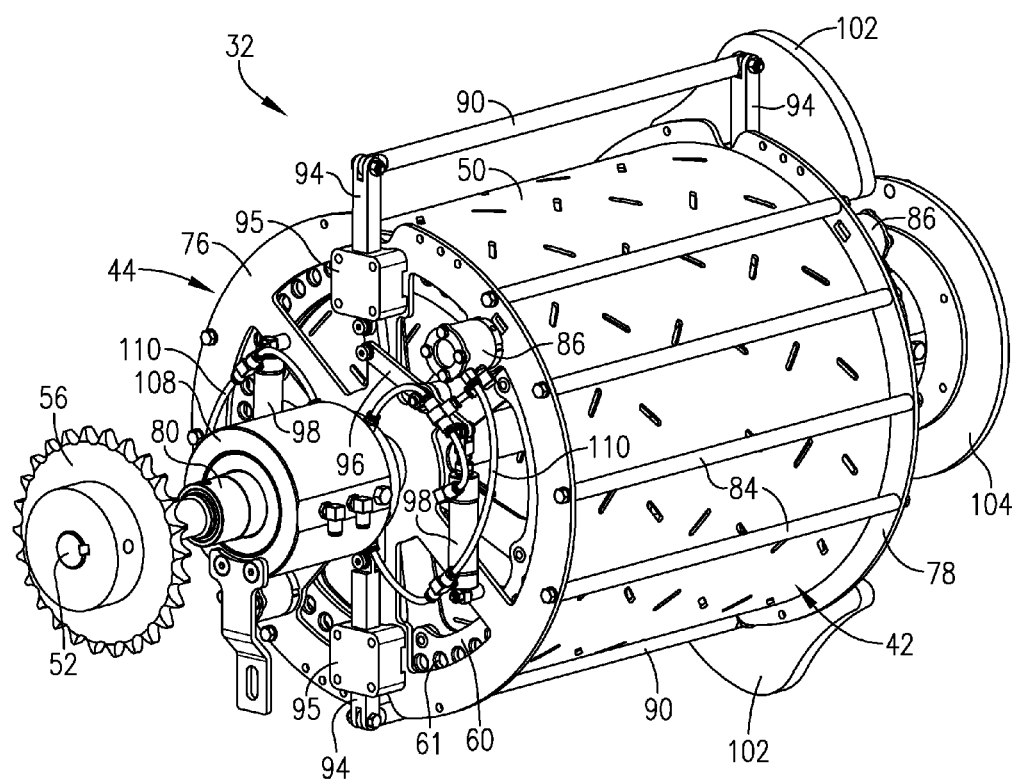
FIG. 8 is a perspective view of the drum of the inversion device, with one of the conveyor lift cams removed to better illustrate the construction of the drum.
Figure 11:
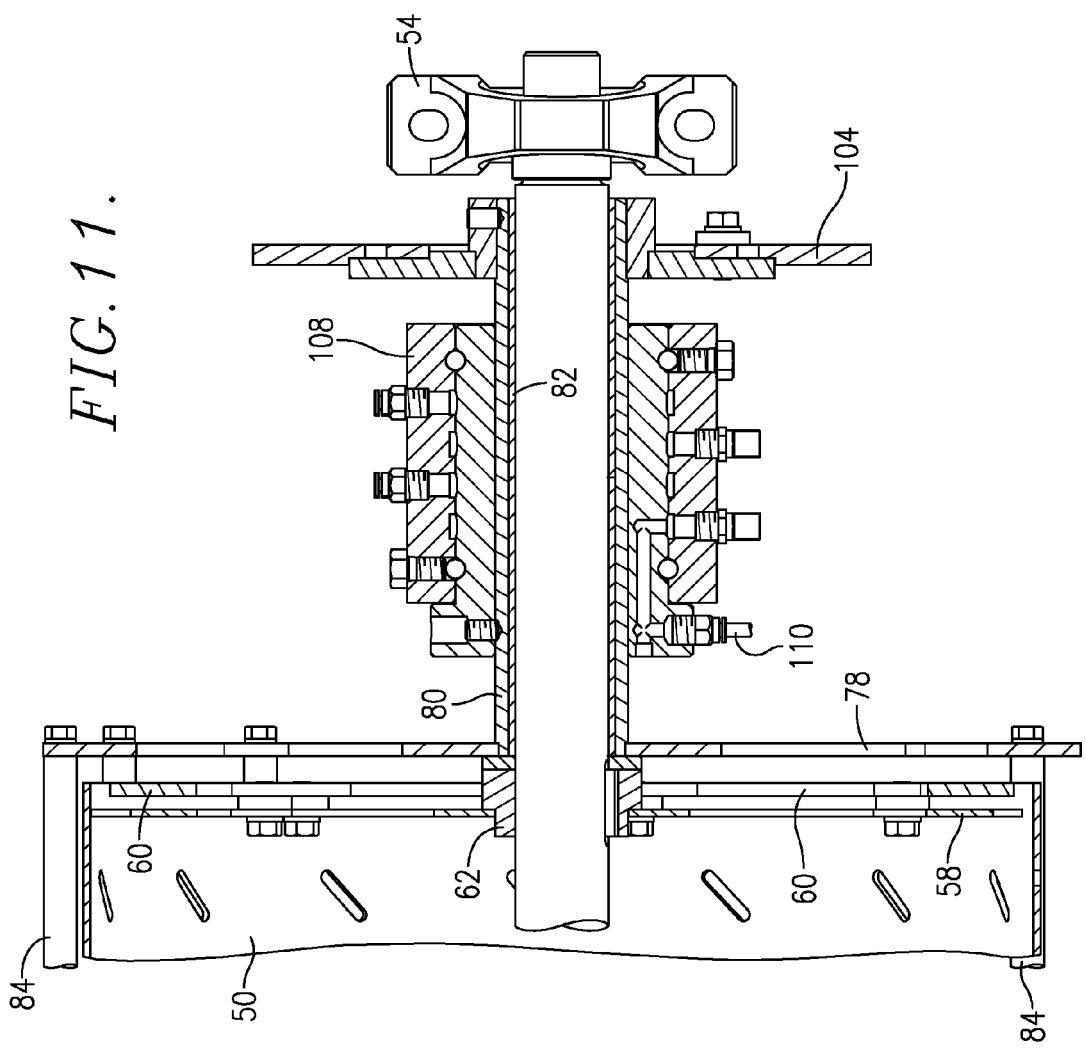
FIG. 11 is a partial vertical sectional view illustrating one of the rotary unions used for supplying positive pressure air to the operating cylinders of the device.

The outer subassembly 44 (FIG. 8) is disposed about the inner subassembly 42 and includes a pair of end plates 76 and 78, respectively adjacent the end plates 46 and 48 of inner subassembly 42. Each of the end plates 76, 78 has a tubular, outwardly projecting extension sleeve 80 which receives shaft 52; a bushing 82 is provided between the shaft 52 and extension sleeve 80 (FIG. 11). A series of elongated, transversely extending, circumferentially spaced, stationary support elements 84 are connected to and between the plates 76, 78.

Figure 7:
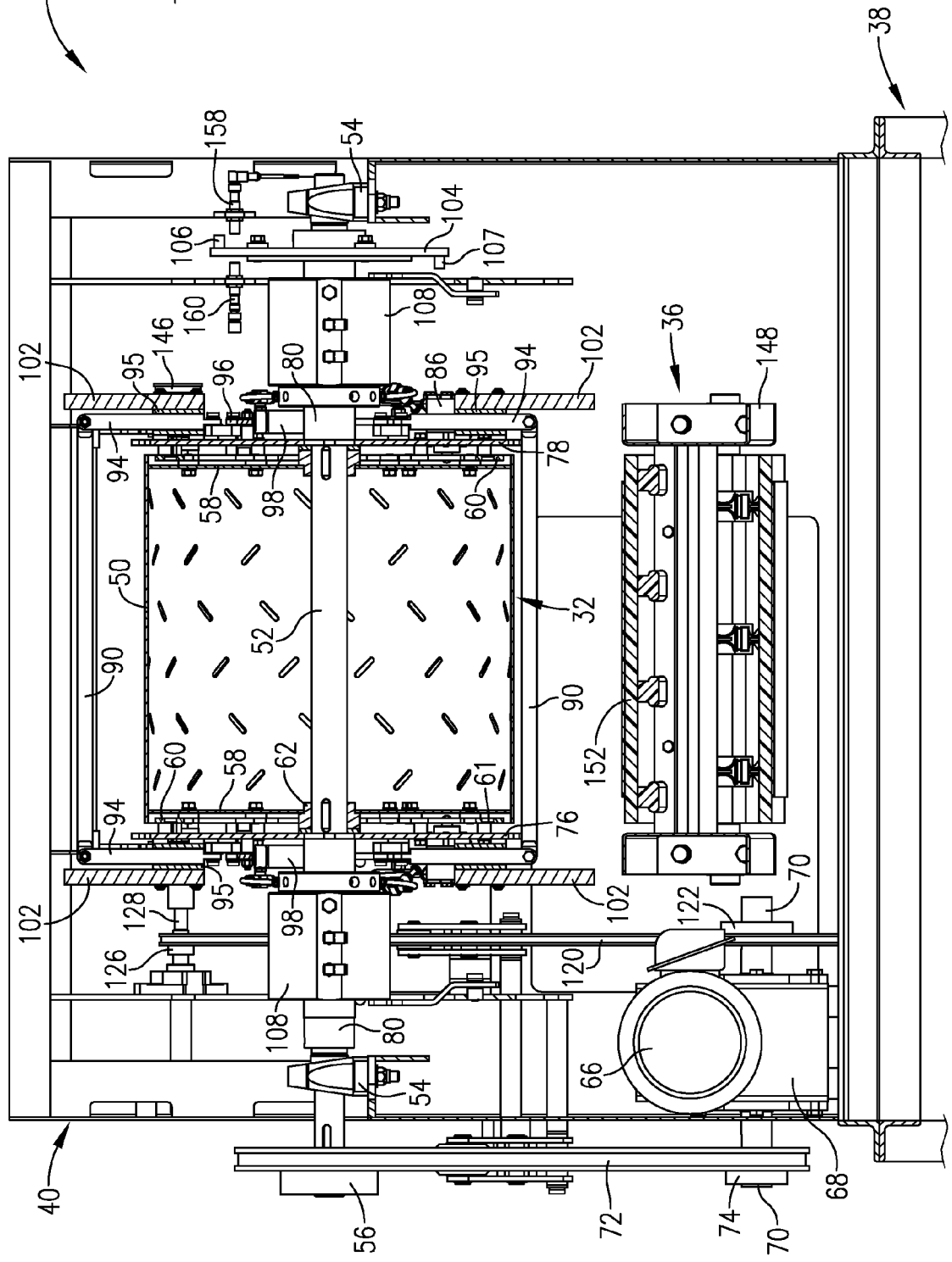
FIG. 7 is a vertical sectional view taken along the line 7-7 of FIG. 4, and illustrating details of the drum and exit conveyor.
Figure 12:
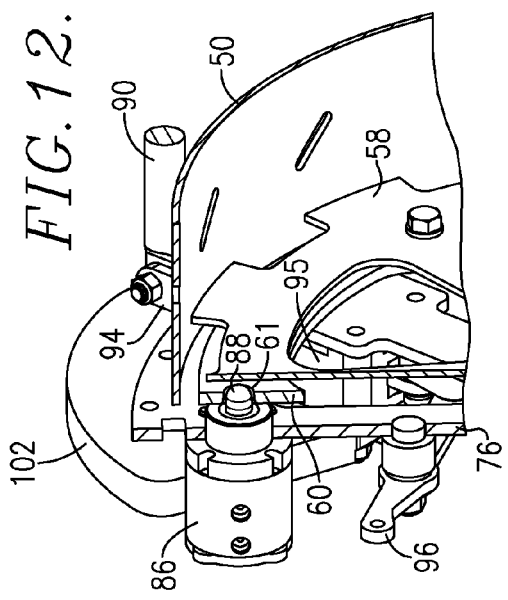
FIG. 12 is a fragmentary perspective view in partial vertical section illustrating the operation of a lock pin cylinder operable to interconnect the inner and outer drum subassemblies.
Figure 13:
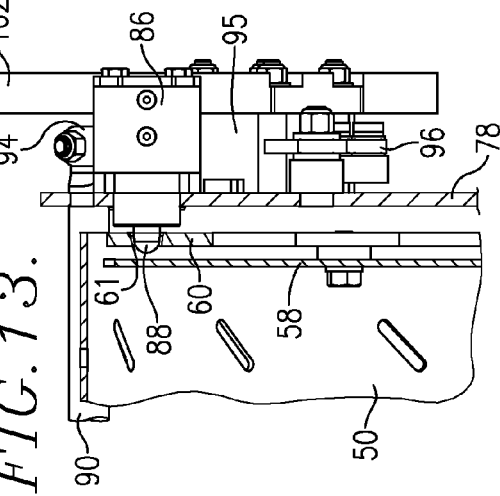
FIG. 13 is a fragmentary view in partial vertical section further illustrating the operation of a lock pin cylinder.
Figure 14:
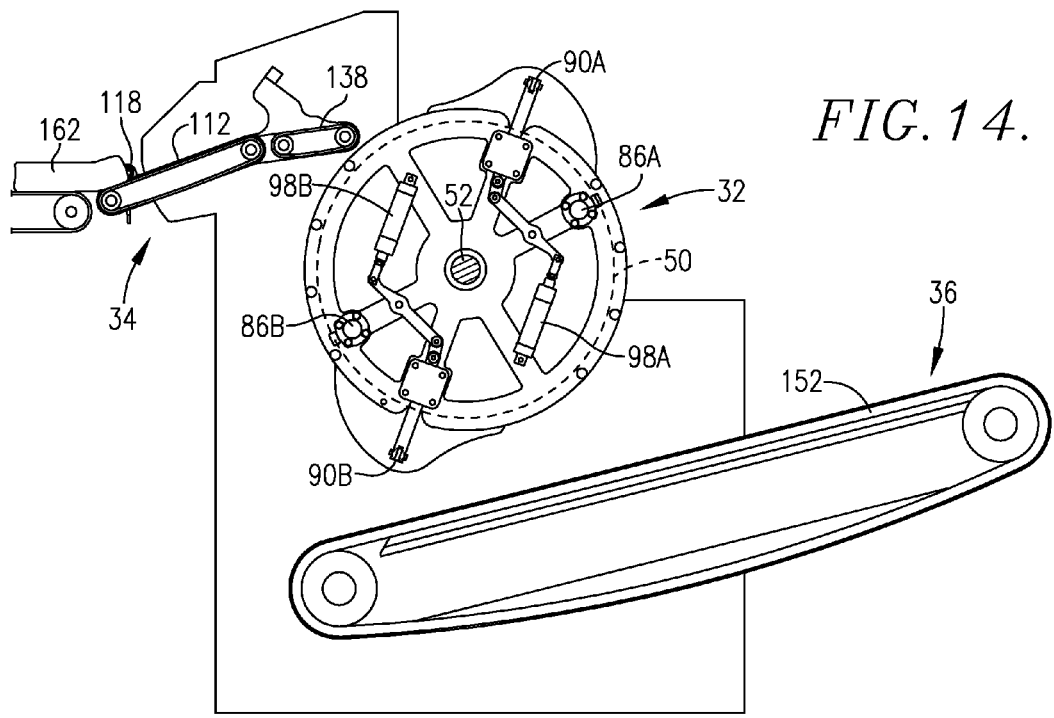
FIG. 14 is a partially schematic side view of the device illustrating the approach of a pork belly to be inverted.

The plates 76, 78 both have a pair of opposed pneumatic lock pin cylinders 86, each including a shiftable rod 88 sized to fit within a selected aperture 61 of an adjacent plate 60 (see FIGS. 12 and 13). Additionally, each plate 76, 78 carries a pair of opposed, transversely extending, radially shiftable clamping rods 90. Each of these rods is supported by a pair of end-mounted struts 94 shiftable within guides 95. The struts 94 are in turn operatively connected to a respective pivot link 96. Pneumatic clamping piston and cylinder assemblies 98 are also supported on each plate 76, 78, with the pistons thereof coupled to a corresponding link 96, in order to effect selective radial movement of the clamping rods 90. A pair of opposed clamping rod-receiving notches 100 are provided in each of the plates 76, 78 (FIG. 10) to accommodate full inward shifting of the clamping rods. The plates 76, 78 also carry a pair of opposed, stationary cams 102 at a position adjacent the clamping rods 90. Finally, the right extension 80, as viewed in FIGS. 10 and 11, includes a circular sensing plate 104 which carries a pair of opposed, projecting dowels 106 and 107 which extend in opposite directions from the plate 104 (FIG. 7).

In order to supply positive pressure air to the lock pin cylinders 86 and the clamping rod piston and cylinder assemblies 98 on demand, a rotary union 108 is keyed to each of the extension sleeves 80. A source of pressurized air (not shown) is directed to each union 108, and appropriate pneumatic lines 110 extend from each union 108 to the associated cylinder 86 or assembly 98.

Figure 4:
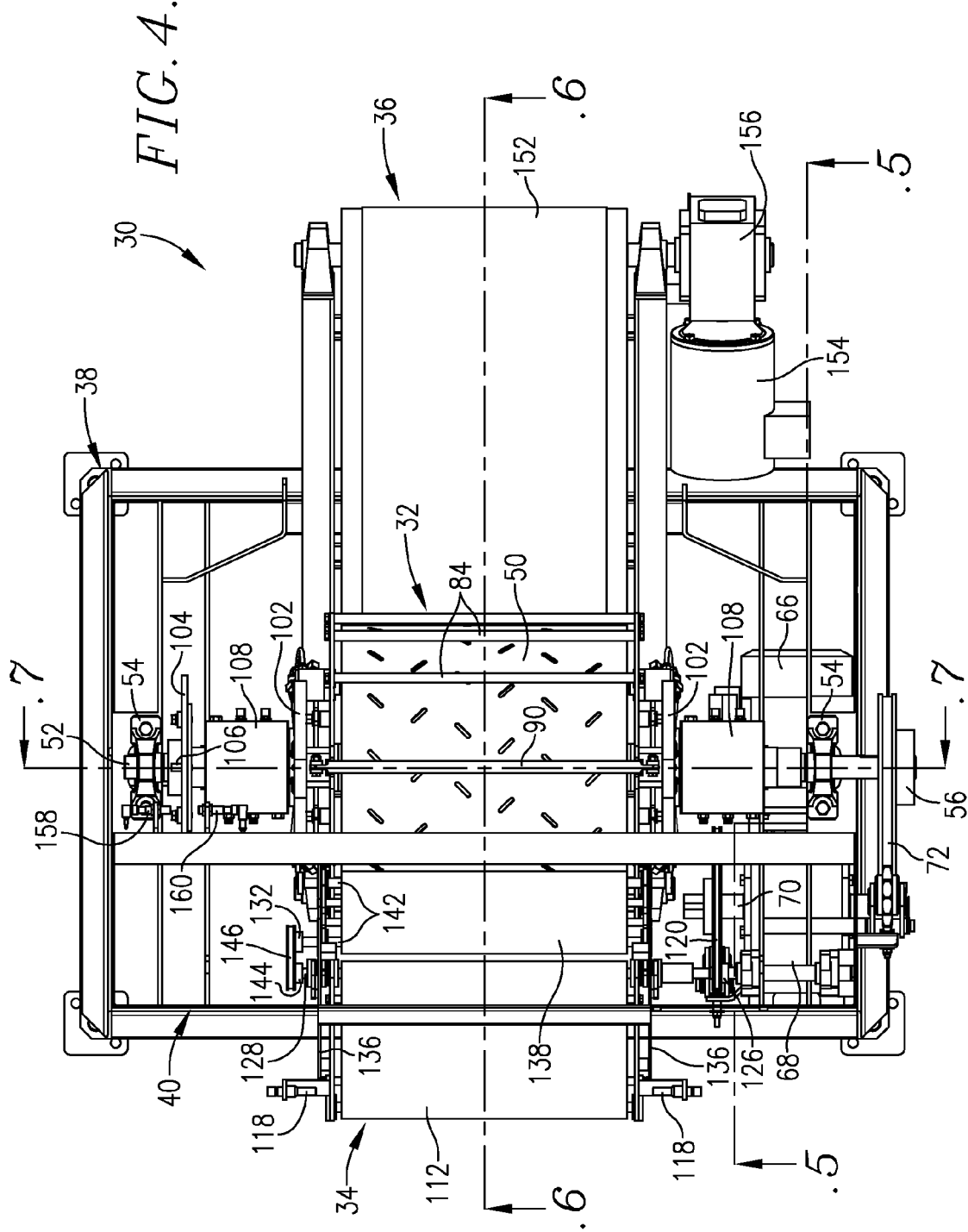
FIG. 4 is a plan view of the inversion device.
Figure 5:
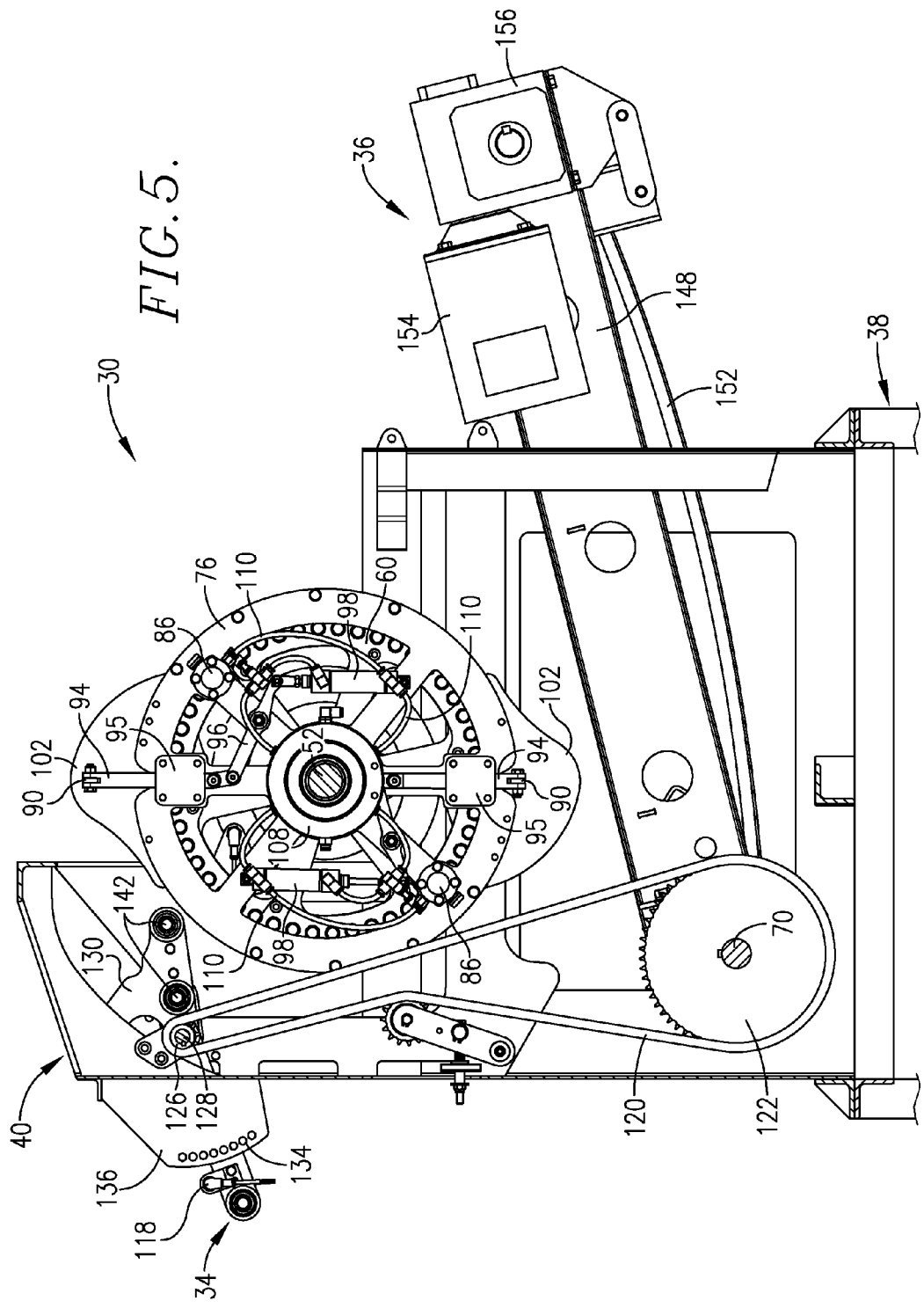
FIG. 5 is a vertical sectional view taken along the line 5-5 of FIG. 4, and illustrating the internal components thereof.
Figure 6:
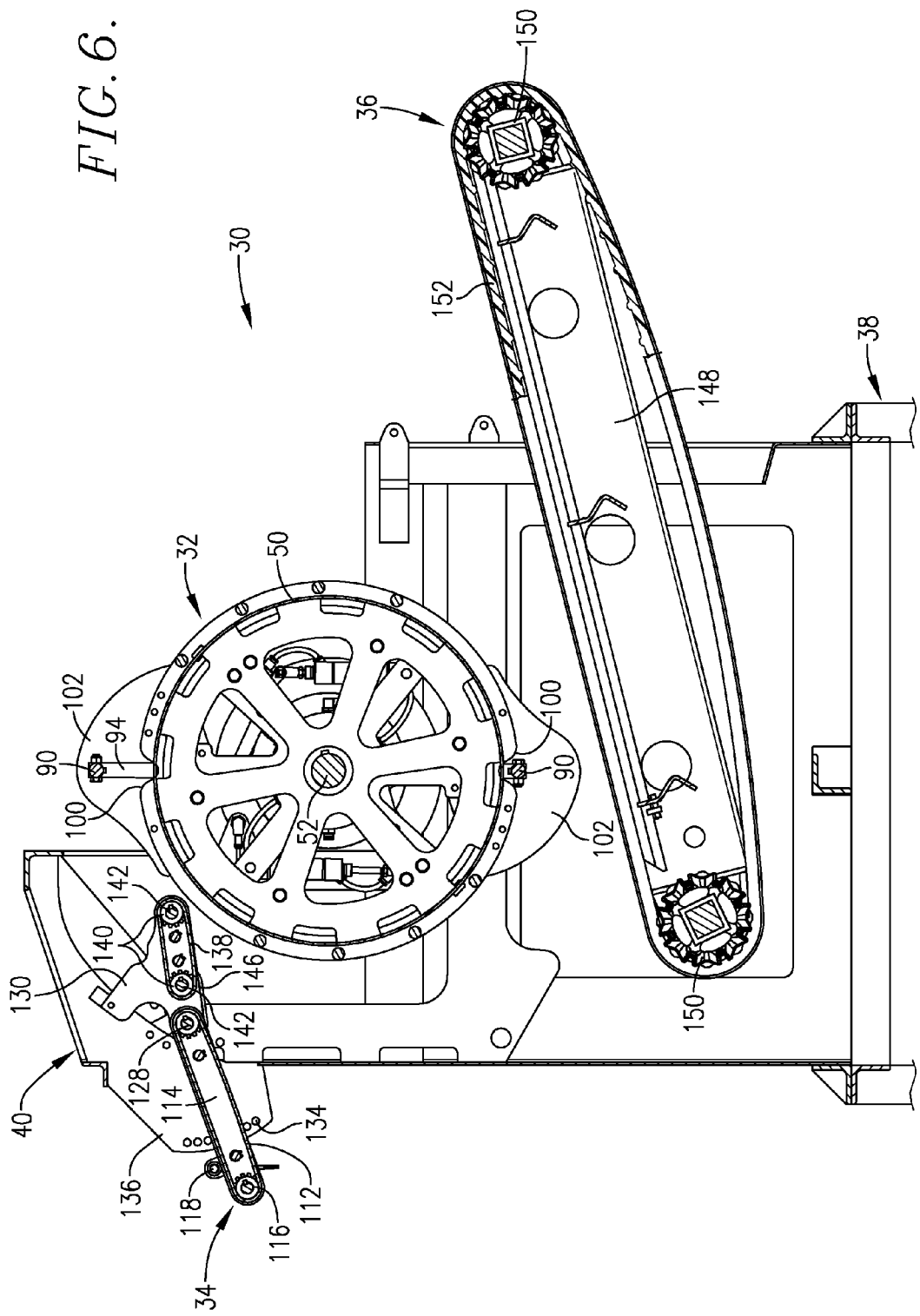
FIG. 6 is a vertical sectional view taken along the line 6-6 of FIG. 4, and illustrating further details of the device.

The entry conveyor 34 (FIG. 6) includes a first wire mesh conveyor belt 112 mounted on a frame 114 and trained about end sprockets 116. A pair of optical sensors 118 are supported on frame 114 and are positioned in opposition above belt 112. The conveyor 34 is powered by means of a drive chain 120 (FIG. 5), which is coupled with a sprocket 122, the latter rotated via drive shaft 70. The chain 120 is also trained about an upper sprocket 126 keyed to transverse shaft 128 (FIG. 6). The shaft 128 also supports the end sprocket 116 nearest inversion drum 32, as well as a second pivoting frame 130, such that shaft 128 defines the pivot axis for the frame 130 and frame 114. The outermost end of the shaft 128 is further equipped with a small sprocket 144 (FIG. 4). The inclination of belt 112 can be altered by means of connectors (not shown) which mate with selected apertures 134 (FIG. 5) provided in housing extensions 136 on opposite sides of the belt 112.

The overall entry conveyor 34 (FIG. 6) includes a second wire mesh conveyor belt 138 supported by the pivoting frame 130, which also support the end sprockets 140 on respective shafts 142. The end of shaft 142 (FIG. 4) closest to belt 112 has a sprocket 132 keyed thereon (FIG. 4). A short drive chain 146 is trained about sprockets 132 and 144, so as to drive the belt 138.

It will be observed that the shaft 128 forms a pivot for both of the conveyor belts 112 and 138. The belt 112 can be adjusted in terms of its inclination, as previously described. Moreover, owing to this construction of the entry conveyor 34, the entirety of belt 138 is also pivotal about shaft 128 through the medium of the pivoting frame 130. The importance of this feature will be made clear hereinafter.

The exit conveyor 36 is disposed below the drum 32 and includes a frame assembly 148 (FIG. 6) supporting two sets of end sprockets 150. A belt 152 is trained about the sprockets 150 and serves to convey inverted product away from the drum assembly 32. The belt 152 is powered by means of a motor 154 also including a variable frequency drive, and a gear reducer assembly 156, the latter being operatively coupled with upper sprockets 150.

Figure 2:
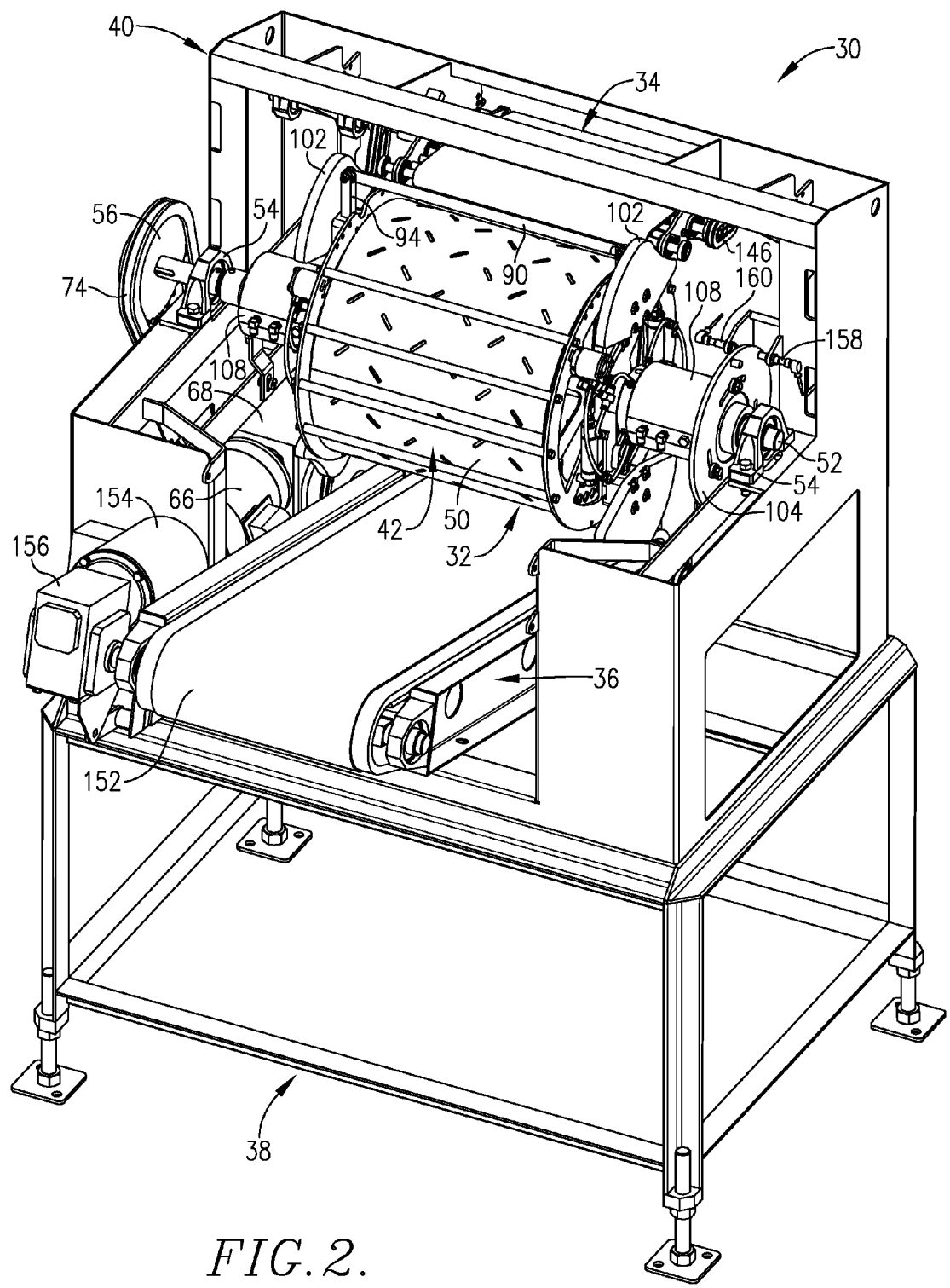
FIG. 2 is a perspective view similar to that of FIG. 1, but showing the outer drum subassembly position sensing arrangement.
Figure 3:
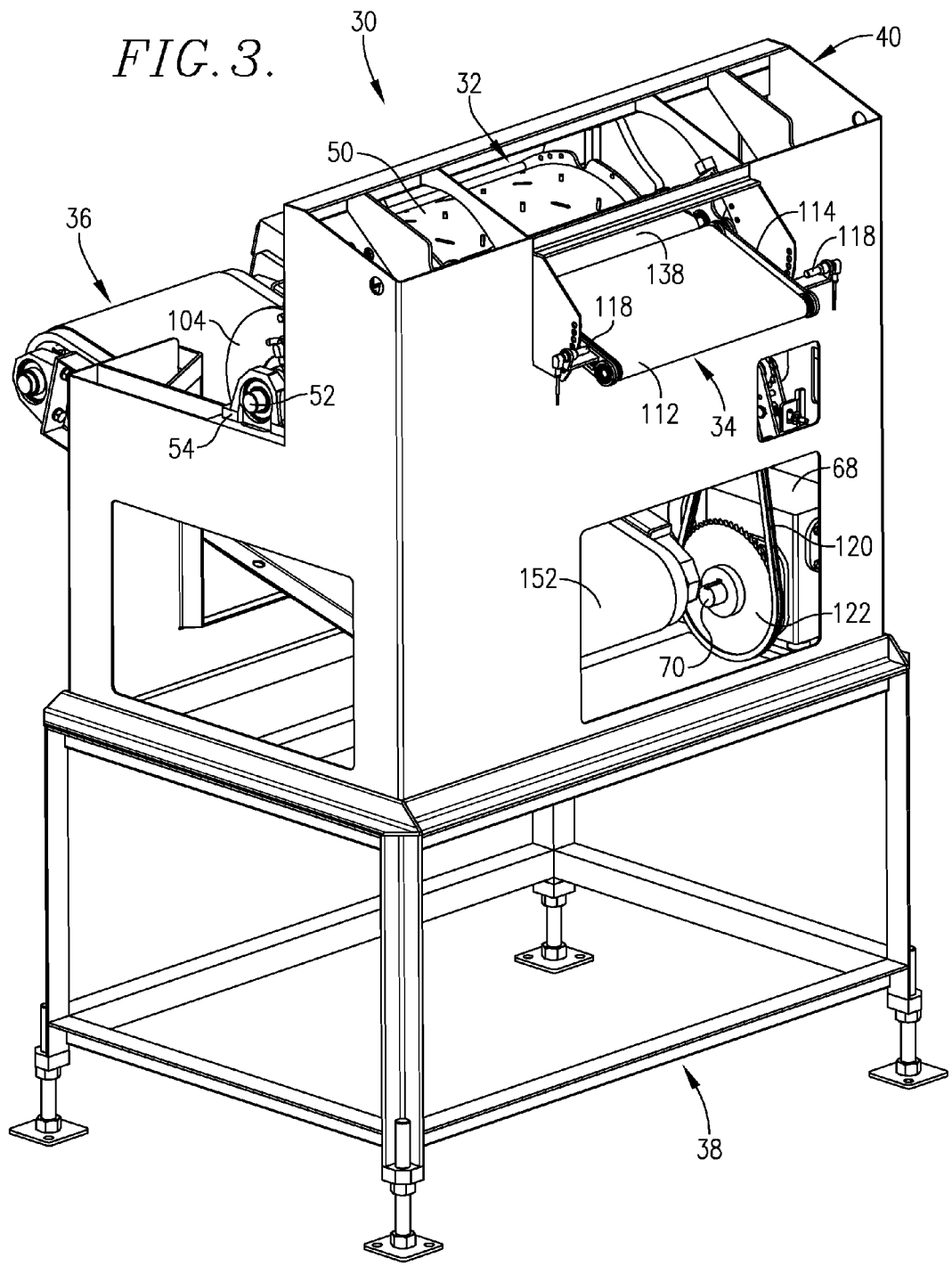
FIG. 3 is a perspective view of the inversion device, viewing the input end thereof.

Operation of the device 30 is controlled by means of a conventional, programmable digital controller (not shown) and the variable frequency drives for each motor 66 and 154. The optical sensors 118 are operatively coupled with the controller, along with a pair of proximity sensors 158 and 160. As best seen in FIGS. 2 and 7, the sensors 158, 160 are supported on opposite sides of the sensing plate 104, such that the sensor 158 senses the proximity of dowel 106, whereas sensor 160 senses dowel 107. The variable frequency drives (not shown) and motors 66 and 154 are also operatively connected with the controller.

In order to selectively operate the cylinders 86 and 98 (FIG. 5), conventional solenoid valves (not shown) are coupled between the digital controller and the unions 108. Thus, when these cylinders are to be operated, the digital controller signals the appropriate solenoid valve to effect the desired cylinder operation. These electrical and pneumatic control elements are themselves conventional, and thus need not be described in detail.

Operation

Figure 15:
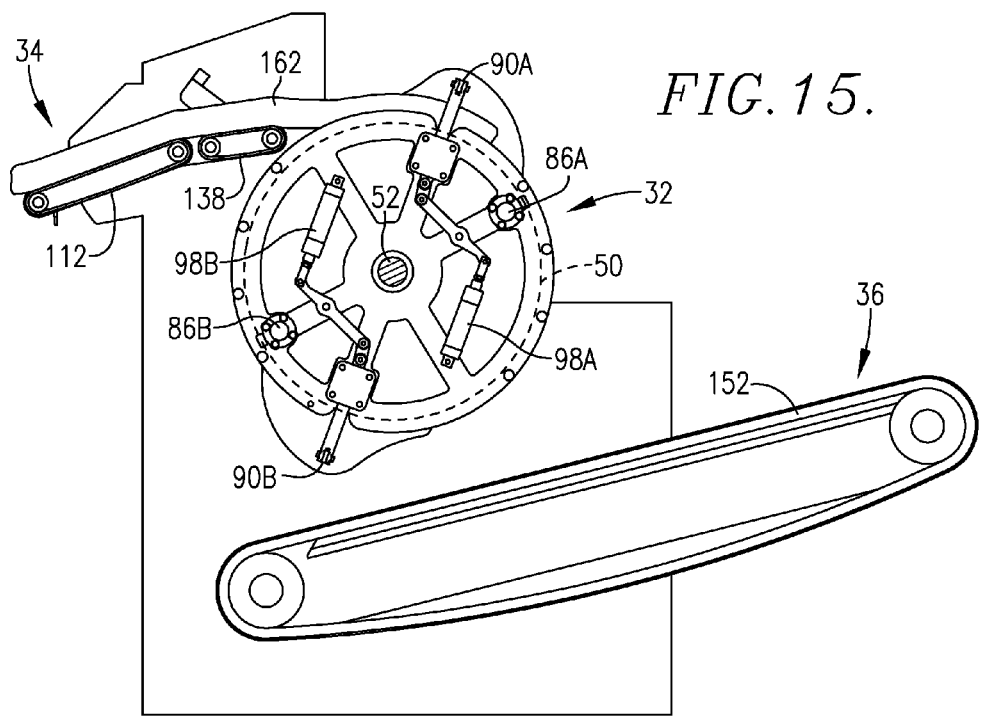
FIG. 15 is a view similar to that of FIG. 14, but illustrating the pork belly advanced onto the inversion drum of the device.
Figure 16:
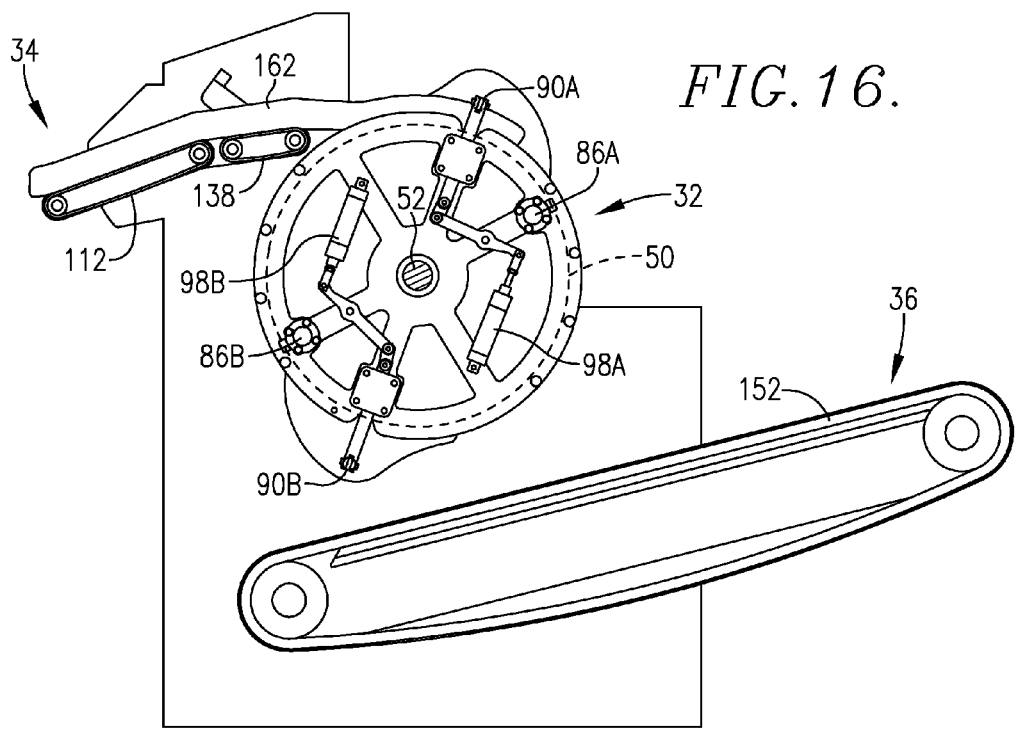
FIG. 16 is a view similar to that of FIG. 15, but illustrating the pork belly clamped to the inversion drum.
Figure 17:
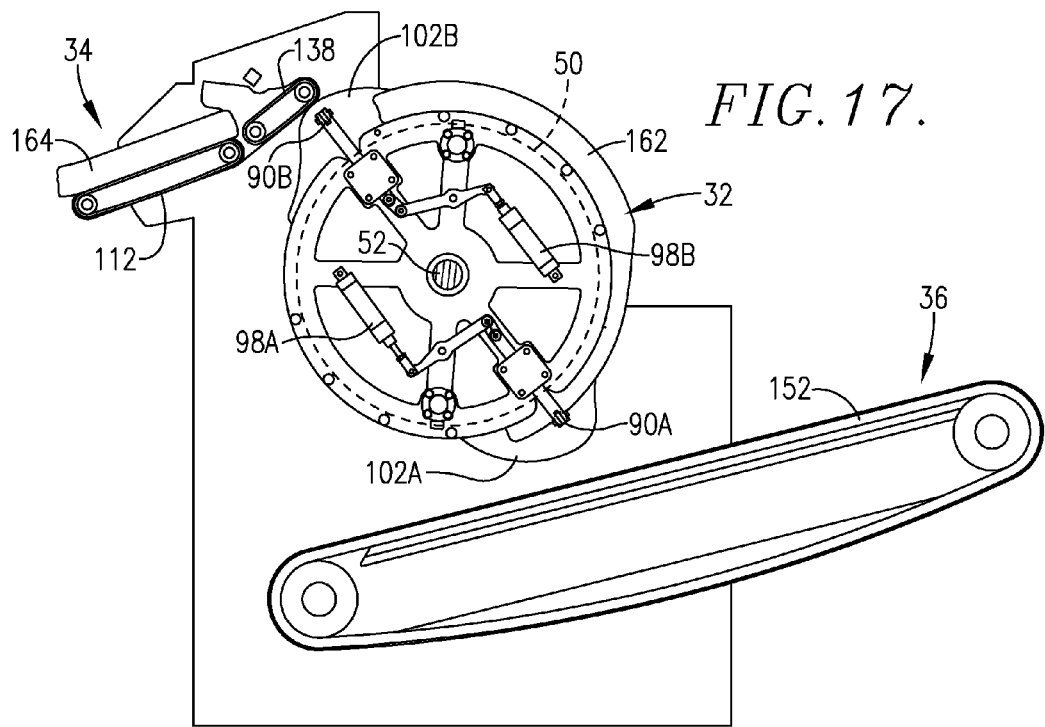
FIG. 17 is a view similar to that of FIG. 16, but illustrating the pork belly rotated towards the exit conveyor while still being clamped to the inversion drum.
Figure 18:
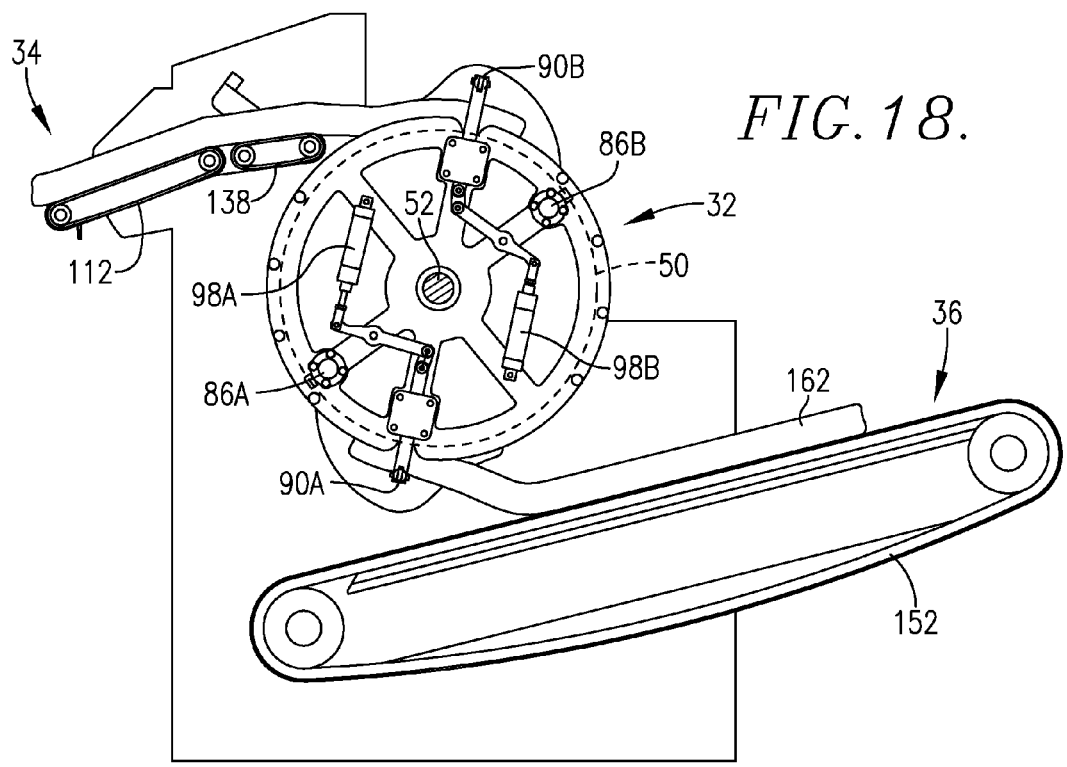
FIG. 18 is a view similar to that of FIG. 17, depicting the pork belly fully inverted and partially on the exit conveyor, but still clamped to the inversion drum
Figure 19:
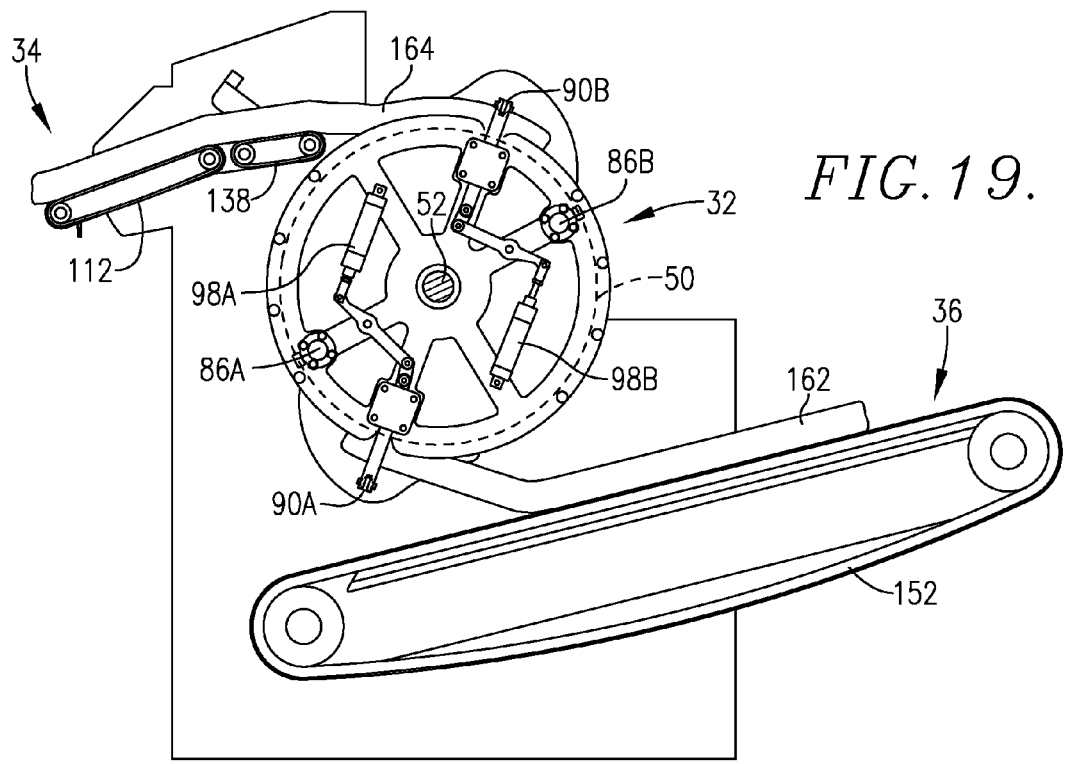
FIG. 19 is a view similar to that of FIG. 18, but illustrating the pork belly as it is being unclamped from the inversion drum.

The operational sequence of device 30 is illustrated in pictorial FIGS. 14-19 and in the flow diagram of FIG. 20. In general, the operational sequence involves first conveying a body 162 to be inverted using entry conveyor 34 (FIG. 14) until the body 162 passes under one of the clamping rods 90 of the rotating outer drum subassembly 44 (FIG. 15, referred to as clamping rod 90A). Then rod 90A is moved radially inwardly by operation of the associated cylinders 98A to clamp the body 162 against the outer subassembly 44 (FIG. 16). Simultaneously, the outer subassembly 44 is engaged with the inner subassembly 42 through actuation of the lock pin cylinders 86A, so that the two subassemblies rotate in unison. Next, the drum 32 rotates so as to invert the body 162 above conveyor belt 152, and also causes the cams 102B to pivot belt 138 upwardly, allowing the other opposed clamping rod 90B to pass beneath the belt in its outwardly extended condition while a second body 164 is being delivered via entry conveyor 34 (FIG. 17). The drum 32 continues to rotate until the majority of the body 162 is placed on moving belt 152 and the second body 164 passes under clamping rod 90B (FIG. 18). In the next steps, the cylinders 98A operate to shift clamping rod 90A radially outwardly to thereby release the now-inverted first body 162 onto conveyor belt 152, and cylinders 98B retract rod 90B to clamp body 164 to drum 32. This sequence of steps then continues as successive bodies are delivered to the device 30, inverted, and moved downstream on exit conveyor 152.

Figure 20A:
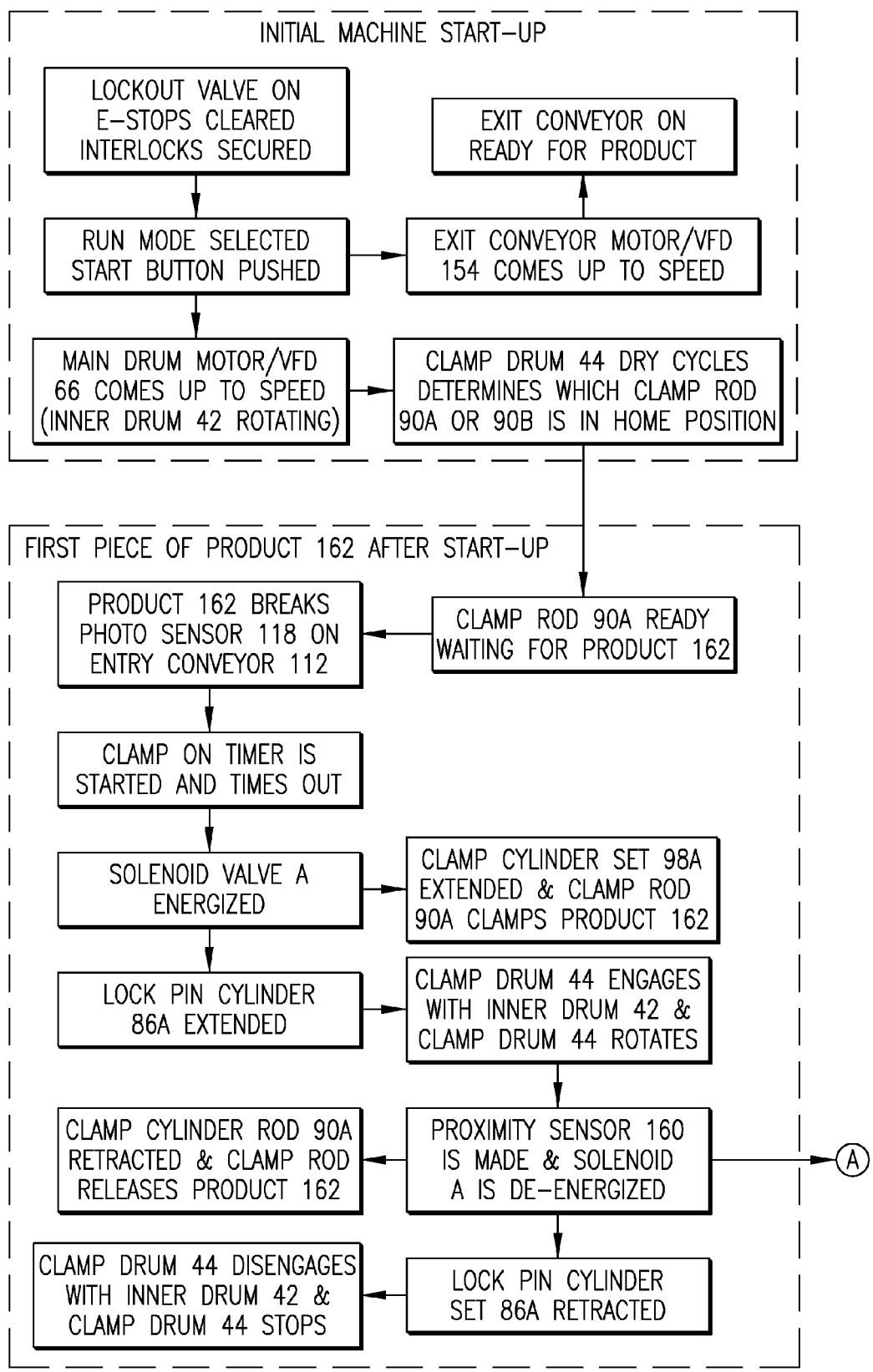
FIG. 20A is the first portion of a schematic flow diagram setting forth the preferred normal sequence of operation of the inversion device.
Figure 20B:
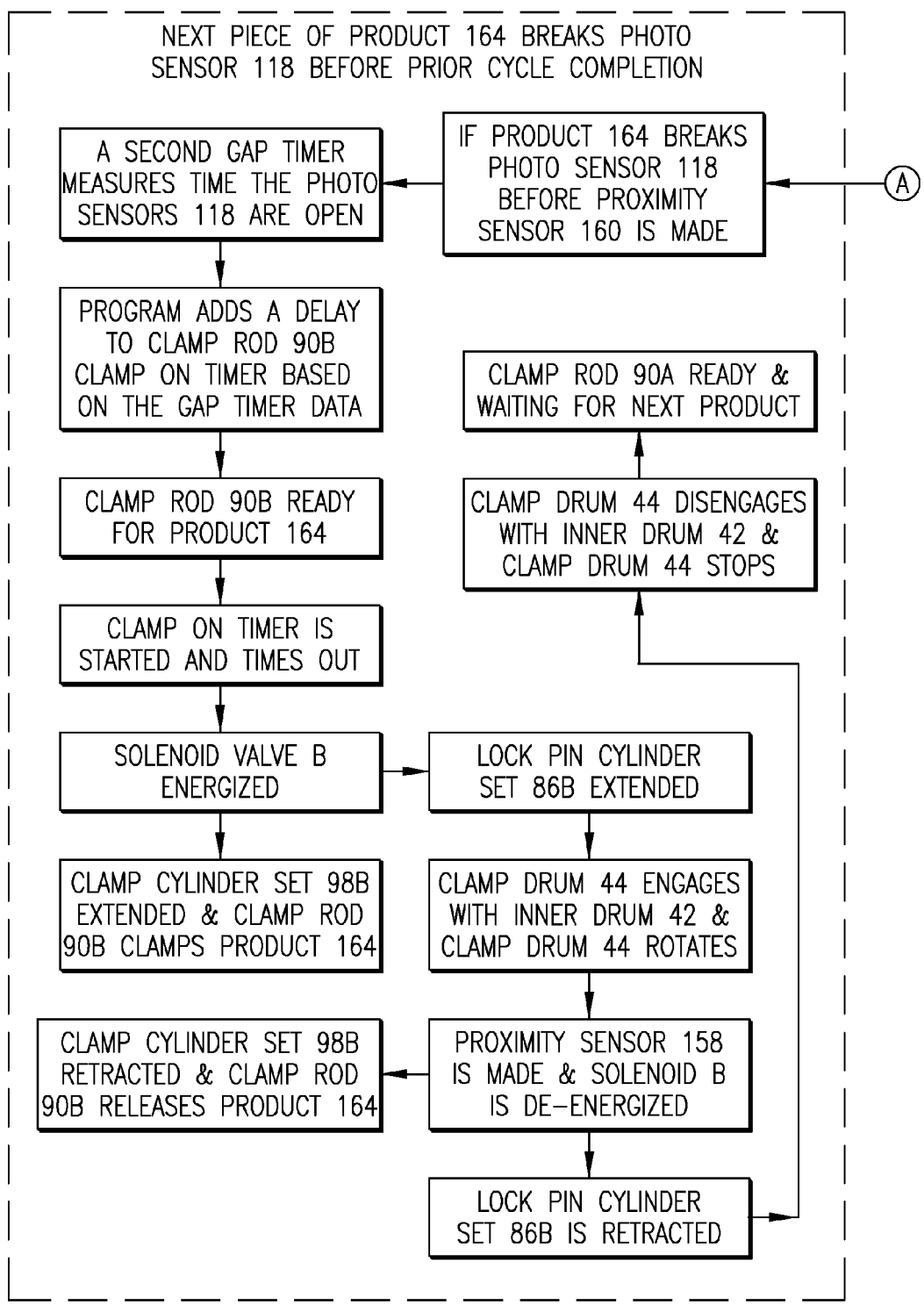
FIG. 20B is a continuation of the flow diagram of FIG. 20A, under a first operational condition respecting the sensed positions of succeeding meat bodies entering the device.
Figure 20C:
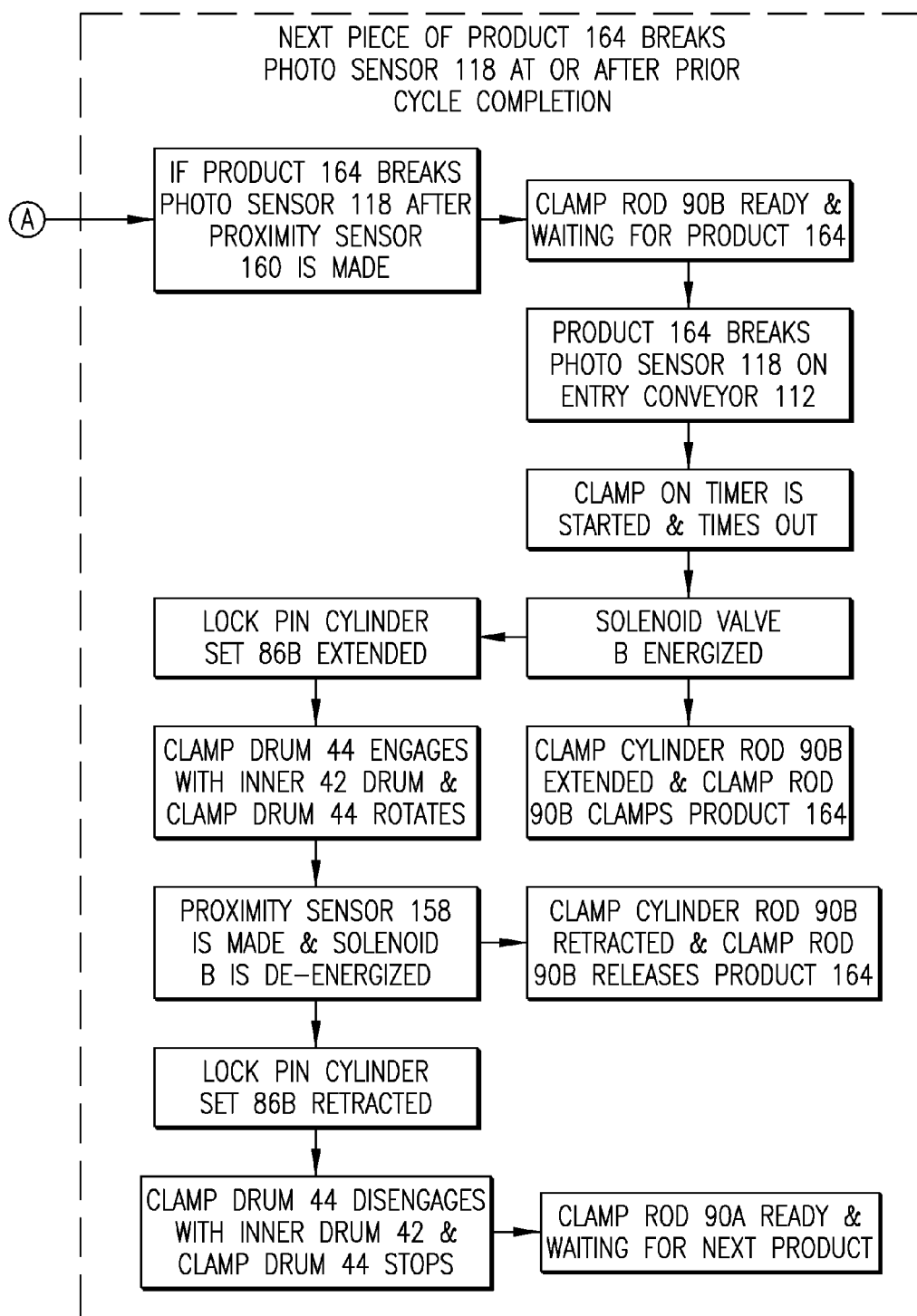
FIG. 20C is a continuation of the flow diagram of FIGS. 20A and 20B, under a second operational condition respecting the sensed positions of succeeding meat bodies entering the device.

Referring to the block diagram of FIGS. 20A-20C, a more detailed description of the normal operation of device 30 is provided, using two different operational conditions respecting the relative sensed positions of succeeding meat bodies 162, 164, at the entrance conveyor 112. Where appropriate, the reference numerals used in the preceding Figures have been employed. "Solenoid Valve A" and "Solenoid Valve B" refer to the conventional solenoid valves operatively connected to the cylinders 86A, 86B, 98A, and 98B described previously. The other references are to conventional control hardware and steps well known to those skilled in the art, including the lockout valve, E-stops, and the timers.

It will thus be appreciated that device 30 is able to efficiently invert meat bodies such as pork bellies on a continuous basis while completely eliminating manual labor. The device has a number of unique features which render it particularly useful in this connection. For example, the provision of the cams 102 together with pivotal mounting of the conveyor belt 138 makes it possible to maintain the adjacent clamping rod 90 in an extended condition as it clears the belt 138, so as to facilitate entry of an incoming pork belly into the space between the clamping rod and drum 32. Additionally, belt 138 fills the gap between belt 112 and drum 32 to convey "limp" or fresh bellies successfully to the drum 32 without the bellies falling between the belt 112 and drum 32. Additionally, both of the entry conveyor belts 112, 138 are powered using a single drive shaft and the belt 38 continues its movement even during upward pivoting thereof. In this same regard, the inclination of the conveyor belt 112 can be adjusted without the need for disconnecting the drive. The use of the lock pin cylinders 86 also allows quick, reliable interconnection of the inner and outer drum subassemblies 42, 44 in properly timed relationship.

We claim:

1. A device operable to invert a body of meat, comprising:
    a rotatable drum comprising an inner drum subassembly and an outer drum subassembly, said inner drum subassembly coupled with a drive for rotation thereof, there being coupling mechanism operable to selectively interconnect said outer drum subassembly to said inner drum subassembly,
    said coupling mechanism comprising a lock pin cylinder operably attached to one of said drum subassemblies and including a shiftable rod, and a series of apertures provided on the other of said drum subassemblies, said lock pin cylinder operable to extend said rod into one of said apertures in order to interconnect the drum subassemblies;
    entry structure operable to convey a body of meat towards said drum;
    a clamping assembly operable to clamp said body of meat to said drum, and to release said body of meat after inversion thereof; and
    exit structure operable to convey said released body of meat away from said drum.

2. The device of claim 1, said lock pin cylinder secured to said outer drum subassembly, said inner drum subassembly having an apertured plate adjacent said lock pin cylinder.

3. The device of claim 1, said clamping assembly comprising an elongated, transversely extending clamping rod, and structure supporting said rod for selective movement thereof toward and away from said drum.

4. The device of claim 3, said support structure comprising a pair of mounting struts secured to the opposed ends of said clamping rod, there being a piston and cylinder assembly operably coupled with at least one of said mounting struts and operable to selectively move the clamping rod toward and away from the drum.

5. The device of claim 1, said drum comprising an inner drum subassembly and an outer drum subassembly, said inner drum subassembly coupled with a drive for rotation thereof, there being coupling mechanism operable to selectively interconnect said outer drum subassembly to said inner drum subassembly, said outer drum assembly including a pair of end plates, there being a plurality of stationary meat body support rods extending between and secured to said end plates.

6. The device of claim 1, said entry structure comprising a powered entry conveyor assembly.

7. The device of claim 6, said entry conveyor assembly including first and second sections, said second section being proximal to said drum and being mounted for pivotal movement.

8. The device of claim 7, said clamping assembly comprising an elongated, transversely extending clamping rod, and structure supporting said rod for selective movement thereof toward and away from said drum, said outer drum subassembly including a lift cam operable to pivot said second section of said entry conveyor assembly so as to permit said clamping rod to pass under said second section without interference during rotation of said drum.

9. A method of inverting a body of meat comprising the steps of:
    directing said body of meat towards a rotatable drum;
    clamping said body of meat to said drum using a clamping assembly, and causing the drum to rotate and invert said body of meat,
    said clamping assembly including an elongated, transversely extending clamping member presenting an inner surface adjacent the drum and an opposed outer surface remote from the drum, said clamping step comprising the steps of shifting said clamping member away from the drum, conveying said body of meat between said member inner surface and said drum, and then shifting the clamping member towards the drum to thereby clamp said body of meat between said member inner surface and said drum;
    releasing said inverted body of meat by shifting the clamping member away from the drum; and
    conveying said inverted body of meat away from said drum.

10. The method of claim 9, said body of meat being a pork belly.

11. The method of claim 9, said drum comprising an inner drum subassembly and an outer drum subassembly, said inner drum subassembly coupled with a drive for rotation thereof, including the step of selectively interconnecting said outer drum subassembly to said inner drum subassembly.

12. The method of claim 11, including the steps of substantially simultaneously interconnecting said outer drum subassembly with said inner drum subassembly, and shifting said clamping rod toward said drum.

13. The method of claim 12, including the step of sensing the position of said outer drum subassembly and substantially simultaneously interconnecting said outer drum subassembly with said inner drum subassembly, and shifting said clamping rod toward said drum in response to said sensing step.

14. An inversion drum operable to invert a body and comprising:
a rotatable inner drum subassembly;
an outer drum subassembly disposed about said inner drum subassembly;
coupling mechanism operable to selectively interconnect the outer drum subassembly to the inner drum subassembly so that the outer drum subassembly rotates with the inner drum subassembly,
said coupling mechanism comprising a lock pin cylinder operably attached to one of said drum subassemblies and including a shiftable rod, and a series of apertures provided on the other of said drum subassemblies, said lock pin cylinder operable to extend said rod into one of said apertures in order to interconnect the drum subassemblies; and
a clamping assembly operably coupled with said outer drum subassembly in order to selectively clamp a body to said outer drum subassembly, and to release said body after inversion thereof.

15. The inversion drum of claim 14, said lock pin cylinder secured to said outer drum subassembly, said inner drum subassembly having an apertured plate adjacent said lock pin cylinder.

16. The inversion drum of claim 14, said clamping assembly comprising an elongated, transversely extending clamping rod, and structure supporting said rod for selective movement thereof toward and away from said drum.

17. The inversion drum of claim 16, said support structure comprising a pair of mounting struts secured to the opposed ends of said clamping rod, there being a piston and cylinder assembly operably coupled with at least one of said mounting struts and operable to selectively move the clamping rod toward and away from the drum.

18. A device operable to invert a body of meat, comprising:
a rotatable drum;
entry structure operable to convey a body of meat towards said drum and comprising a powered entry conveyor assembly;
a clamping assembly operable to clamp said body of meat to said drum, and to release said body of meat after inversion thereof; and
exit structure operable to convey said released body of meat away from said drum.

19. A device operable to invert a body of meat, comprising:
a rotatable drum;
entry structure operable to convey a body of meat towards said drum;
a clamping assembly operable to clamp said body of meat to said drum, and to release said body of meat after inversion thereof,
said clamping assembly including an elongated, transversely extending clamping member presenting an inner surface adjacent said drum and an opposed outer surface remote from said drum, and structure for supporting said member for selective movement thereof towards and away from said drum, so that when the clamping member is shifted away from said drum, said entry structure conveys said body of meat so that said body of meat is between said member inner surface and said drum, and so that when the clamping member is thereafter shifted towards said drum, said body of meat is clamped between said member inner surface and said drum; and
exit structure operable to convey said released body of meat away from said drum.

20. A method of inverting a body of meat comprising the steps of:
directing said body of meat towards a rotatable drum using a powered entry conveyor;
clamping said body of meat to said drum, and causing the drum to rotate and invert said body of meat;
releasing said inverted body of meat; and
conveying said inverted body of meat away from said drum.

21. A method of inverting a body of meat comprising the steps of:
directing said body of meat towards a rotatable drum;
clamping said body of meat to said drum, and causing the drum to rotate and invert said body of meat, said clamping step comprising the steps of moving a clamping member presenting an inner surface adjacent said drum and an outer surface remote from said drum away from said drum, inserting said body of meat between said inner surface and said drum, and then moving the clamping member towards the drum so as to clamp the body of meat between said inner surface and said drum;
releasing said inverted body of meat; and
conveying said inverted body of meat away from said drum.

22. An inversion drum operable to invert a body and comprising:
a rotatable inner drum subassembly;
an outer drum subassembly disposed about said inner drum subassembly;
coupling mechanism operable to selectively interconnect the outer drum subassembly to the inner drum subassembly so that the outer drum subassembly rotates with the inner drum subassembly; and
a clamping assembly operably coupled with said outer drum subassembly in order to selectively clamp a body to said outer drum subassembly, and to release said body after inversion thereof,
said clamping assembly including an elongated, transversely extending clamping member presenting an inner surface adjacent said drum and an opposed outer surface remote from said drum, and structure for supporting said member for selective movement thereof towards and away from said drum, so that when the clamping member is shifted away from said drum, said entry structure conveys said body of meat so that said body of meat is between said member inner surface and said drum, and so that when the clamping member is thereafter shifted towards said drum, said body of meat is clamped between said member inner surface and said drum.

* * * * *